United States Patent
Donovan et al.

(10) Patent No.: US 12,255,343 B2
(45) Date of Patent: *Mar. 18, 2025

(54) BATTERY PACK FOR FAILURE SAFETY

(71) Applicant: BETA AIR, LLC, South Burlington, VT (US)

(72) Inventors: Sean Richard Donovan, Richmond, VT (US); Sam Wagner, Westford, VT (US)

(73) Assignee: BETA AIR LLC, South Burlington, VT (US)

( * ) Notice: Subject to any disclaimer, the term of this patent is extended or adjusted under 35 U.S.C. 154(b) by 305 days.

This patent is subject to a terminal disclaimer.

(21) Appl. No.: 17/843,708

(22) Filed: Jun. 17, 2022

(65) Prior Publication Data
US 2022/0393287 A1    Dec. 8, 2022

Related U.S. Application Data

(63) Continuation of application No. 17/319,201, filed on May 13, 2021, now Pat. No. 11,394,078.

(51) Int. Cl.
| | |
|---|---|
| *H01M 50/242* | (2021.01) |
| *H01M 10/42* | (2006.01) |
| *H01M 50/204* | (2021.01) |
| *H01M 50/218* | (2021.01) |
| *H01M 50/227* | (2021.01) |
| *H01M 50/579* | (2021.01) |
| *H01M 10/653* | (2014.01) |
| *H01M 50/249* | (2021.01) |
| *H01M 50/298* | (2021.01) |

(52) U.S. Cl.
CPC ....... *H01M 50/242* (2021.01); *H01M 10/425* (2013.01); *H01M 50/204* (2021.01); *H01M 50/218* (2021.01); *H01M 50/227* (2021.01); *H01M 50/579* (2021.01); *H01M 10/653* (2015.04); *H01M 50/249* (2021.01); *H01M 50/298* (2021.01); *H01M 2220/20* (2013.01)

(58) Field of Classification Search
CPC ............. H01M 50/242; H01M 50/579; H01M 50/204; H01M 50/218; H01M 50/249
See application file for complete search history.

(56) References Cited

U.S. PATENT DOCUMENTS

| | | | |
|---|---|---|---|
| 9,685,644 B2 * | 6/2017 | Lampe-Onnerud | H01M 10/0525 |
| 2009/0166116 A1 * | 7/2009 | Kiya | H01M 50/209 |
| | | | 180/68.5 |
| 2014/0376157 A1 * | 12/2014 | Oh | H01G 2/04 |
| | | | 361/434 |
| 2021/0184290 A1 * | 6/2021 | Sweet | H01M 10/653 |
| 2021/0351469 A1 * | 11/2021 | Poloczek | B21D 53/88 |
| 2022/0048622 A1 * | 2/2022 | Wake | H02H 7/18 |
| 2022/0320659 A1 * | 10/2022 | Munjurulimana | H01M 50/249 |
| 2023/0158878 A1 * | 5/2023 | Ota | H01M 10/6556 |
| | | | 429/120 |

* cited by examiner

*Primary Examiner* — Jonathan G Jelsma
(74) *Attorney, Agent, or Firm* — Hoffman Warnick LLC

(57) ABSTRACT

An electric aircraft with a battery pack for failure safety is provided. The battery pack may be disposed within a fuselage of the electric aircraft. The battery pack may include a crush zone having energy absorbing material configured to compress as a function of a crash force.

17 Claims, 4 Drawing Sheets

BATTERY PACK FOR FAILURE SAFETY

CROSS-REFERENCE TO RELATED APPLICATIONS

This application is a continuation of Nonprovisional application Ser. No. 17/319,201, filed on May 13, 2021, and entitled "BATTERY PACK FOR FAILURE SAFETY," the entirety of which is incorporated herein by reference.

FIELD OF THE INVENTION

The present invention generally relates to the field of batteries. In particular, the present invention is directed to a battery pack for failure safety.

BACKGROUND

Battery packs are built to be stiff external shells to protect the batteries inside from impact forces. However large impact forces will often result in thermal runaway as a function of the limited amount of rigid protection. This leads to hazardous conditions and uncontrolled combustion, which puts many individuals in harmful situations.

SUMMARY OF THE DISCLOSURE

In an aspect, an electric aircraft with a battery pack for failure safety is provided. The electric aircraft includes a fuselage having a longitudinal axis. The electric aircraft includes a battery pack disposed within the fuselage. The battery pack includes a pack casing mounted to the fuselage, wherein the pack casing comprises an inner lining. The battery pack also includes a crush zone positioned perpendicular to the longitudinal axis, wherein the crush zone includes an energy absorbing material configured to compress as a function of a crash force.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to a battery pack for failure safety. In an embodiment, this allows for enhanced safety of a battery experiencing a vertical drop such as a crash landing and/or hard landing. This is so, at least in part, because the battery pack incorporates a crush zone located beneath a battery module that comprises an energy absorbing material configured to compress as a function of a crash force. Aspects of the present disclosure allow for a battery pack for failure safety. Exemplary embodiments illustrating aspects of the present disclosure are described below in the context of several specific examples.

Figure 1:
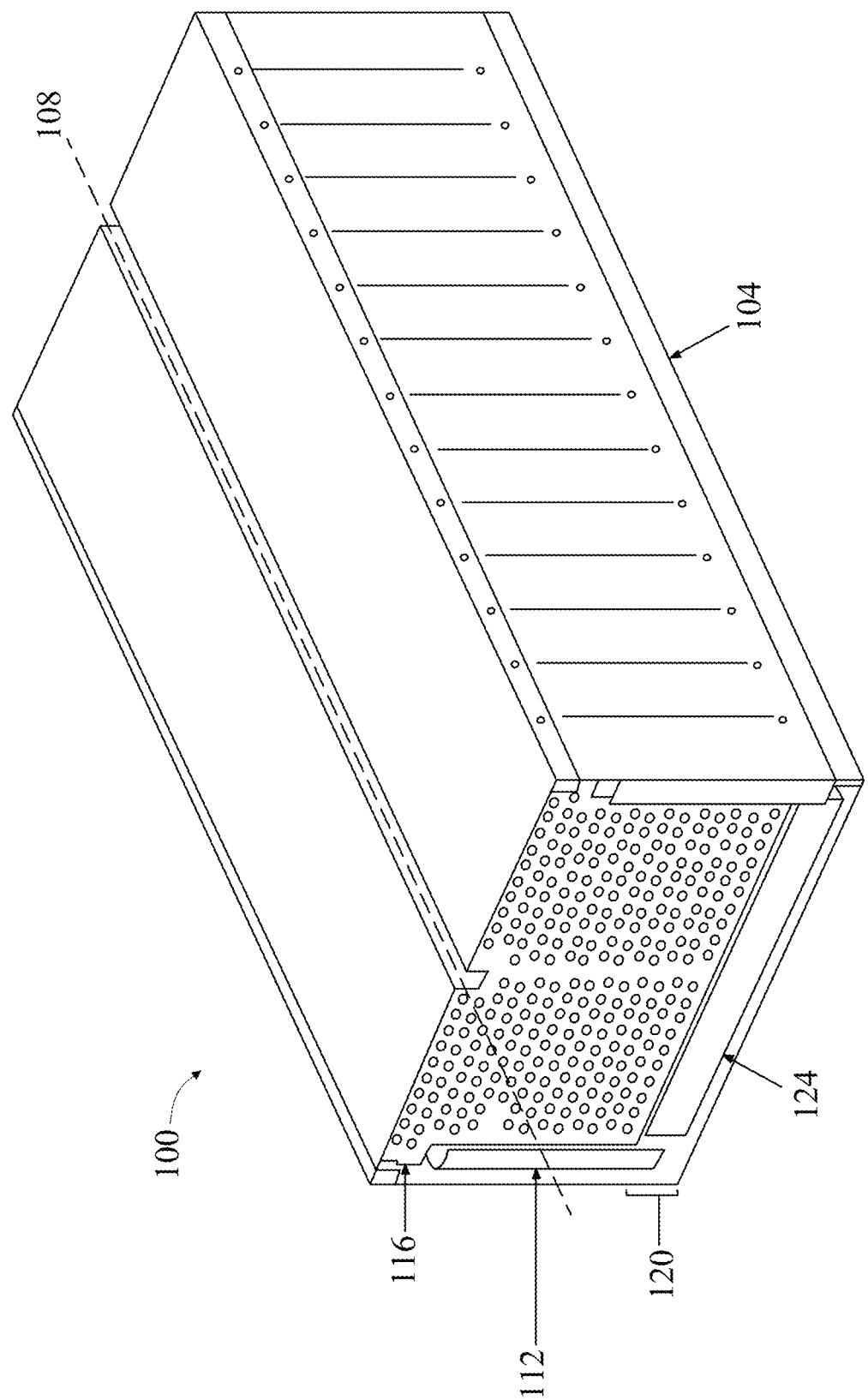
FIG. 1 is a diagrammatic representation of an exemplary embodiment of a battery pack for failure safety.

Referring now to the drawings, FIG. 1 illustrates an exemplary method of a battery pack 100 for failure safety. Battery pack 100 includes a pack casing 104. As used in this disclosure a "pack casing" is a rigid compartment and/or chamber that may hold and/or protect a plurality of components. In an embodiment, pack casing may include one or more materials capable of protecting the plurality of components located inside of the compartment and/or chamber. For example, and without limitation, a material may consist of wood, aluminum, steel, titanium, polymers, graphite-epoxy, composites, and the like thereof. As a further non-limiting example, pack casing 104 may include a material such as polycarbonate, acrylonitrile butadiene styrene, polypropylene, high impact polystyrene, and the like thereof. In an embodiment, pack casing may include an upper wall. As used in this disclosure an "upper wall" is a piece of material that encloses the upper portion of the compartment, wherein a material may include any of the materials as described above; upper wall may be or include a continuous piece of material. For example, upper wall may include a sheet of polypropylene that protects the compartment and or chamber from objects and/or the environment located above pack casing 104. In an embodiment, upper wall of pack casing 104 may include a recess 108 located along a central longitudinal axis 108. As used in this disclosure a "central longitudinal axis" is a directional axis that extends along a longitudinal direction from the rear of the pack casing to the front of the pack casing. Pack casing 104 may include at least a side wall. As used in this disclosure a "side wall" is a piece of material that encloses one or more lateral portions of the compartment; side wall may be or include a continuous piece of material. Side wall may be configured with a high compression strength element. As used in this disclosure a "high compression strength element" is an element that has a large hardness rating and/or resists being squeezed together. In an embodiment high compression strength element may be determined as a function of a Mohs scale. For example and without limitation, a high compression strength element may include a material that has a 9 mohs scale value. In yet another embodiment, high compression strength element may be determined as a function of a Vickers hardness test. For example and without limitation, a high compression strength element may include a material that has a 180HV30 HV value. Pack casing 104 may include a lower wall. In yet another embodiment, high compression strength element may include one or more arrangements of materials such as a honeycomb arrangement. In yet another embodiment, high compression strength element may include one or more element such as a foam and/or polymer described below. As used in this disclosure a "lower wall" is a piece of material that encloses the lower and/or bottom portion of the compartment; lower wall may be or include a continuous piece of material wherein a material may include any of the materials as described above. Lower wall may include one or more walls and/or materials that contact a ground below pack casing 104.

Still referring to FIG. 1, pack casing 104 is configured with an inner lining 112. As used in this disclosure an "inner lining" is an inner panel located within pack casing 104 that guides and/or directs battery module 116 towards energy compressing material 124 as a function of one or more grooved fittings. For example, and without limitation, inner lining may include one or more guide rail systems that adopt a grooved structure and are arranged to orient and/or guide a falling and/or moving object in a direction. In an embodiment, inner lining 112 may be secured to the side wall of pack casing 104 to guide battery module 116. Inner lining 112 may be secured as a function of one or more attaching mechanisms such as bolting, riveting, welding, press fitting, and the like thereof as described above in detail. Further, inner lining 112 may be secured as a function of one or more blind and/or pop rivets, solid and/or round head rivets, oxy-acetylene welds, electric arc welds, shielded metal arc welds, gas metal arc welds, composite press-fit inserts, and/or one or more locking methods such as, but not limited to friction locking methods, mechanical locking methods, adhesive locking methods, and the like thereof. In yet another embodiment, inner lining 112 may be composed of one or more rigid elements that at least provide structure for battery module 116 to be guided. For example, and without limitation, inner lining 112 may be composed of one or more rigid elements such as polycarbonate, acrylonitrile butadiene styrene, polypropylene, high impact polystyrene, perfluoroalkoxy alkane, polytetrafluoroethylene, polyvinylidene fluoride, ceramic, and the like thereof. As a further non-limiting example, inner lining 112 may include one or more metals such as stainless steel, duplex alloys, nickel, nickel-based alloys, titanium, titanium alloys, and the like thereof.

Still referring to FIG. 1, battery pack 100 includes a battery module 116 of a plurality of battery modules. As used in this disclosure a "battery module" is a module comprising a plurality of battery cells wired together in series and/or in parallel. In an embodiment, and without limitation, battery cells may be wired together using any connection permitting electric conduction, such as but not limited to plug and socket connectors, crimp-on connectors, soldered connectors, insulation-displacement connectors, binding posts, screw terminals, ring and spade connectors, blade connectors, and the like thereof. In an embodiment, battery module 116 may be disposed between upper wall, side wall, and/or lower wall such that they are enclosed within at least 4 sides of the pack casing 104. In an embodiment, a battery module may be disposed in or on an eVTOL aircraft and may provide power to at least a portion of an aircraft in flight or on the ground, for example, the battery module may provide power within an entire flight envelope of an aircraft including, for example, emergency procedures. In an embodiment, and without limitation, battery module 116 may be used to provide a steady supply of electrical power to a load over the course of a flight by a vehicle or other electric aircraft. For example, the battery module 116 may be capable of providing sufficient power for "cruising" and other relatively low-energy phases of flight. Battery module 116 may also be capable of providing electrical power for some higher-power phases of flight as well, particularly when the energy source is at a high SOC, as may be the case for instance during takeoff. In an embodiment, battery module 116 may be capable of providing sufficient electrical power for auxiliary loads including without limitation, lighting, navigation, communications, de-icing, steering or other systems requiring power or energy. Further, battery module 116 may be capable of providing sufficient power for controlled descent and landing protocols, including, without limitation, hovering descent or runway landing. As used herein batter module 116 may have high power density where the electrical power the battery module may usefully produce per unit of volume and/or mass is relatively high. The electrical power is defined as the rate of electrical energy per unit time. Battery module 116 may include a device for which power that may be produced per unit of volume and/or mass has been optimized, at the expense of the maximal total specific energy density or power capacity, during design.

The battery module, as a whole, may comprise hardware for mechanical and electrical coupling to at least a portion of eVTOL aircraft. In an embodiment battery module 116 may include a plurality of battery cells. Battery cells may be disposed and/or arranged within a respective battery module 116 in groupings of any number of columns and rows. For example and without limitation, battery cells may be arranged in battery module 116 with 18 cells in two columns. One of skill in the art will understand that battery cells may be arranged in any number to a row and in any number of columns and further, any number of battery cells may be present in battery module 116. In an embodiment and without limitation, battery cells within a first column may be disposed and/or arranged such that they are staggered relative to battery cells within a second column. In this way, any two adjacent rows of battery cells may not be laterally adjacent but instead may be respectively offset a predetermined distance. In another embodiment, any two adjacent rows of battery cells may be offset by a distance equal to a radius of a battery cell. This arrangement of battery cells is only a non-limiting example and in no way preclude other arrangement of battery cells.

Still referring to FIG. 1, battery cells may each comprise a cell configured to include an electrochemical reaction that produces electrical energy sufficient to power at least a portion of an eVTOL aircraft. Battery cell may include electrochemical cells, galvanic cells, electrolytic cells, fuel cells, flow cells, voltaic cells, or any combination thereof—to name a few. In an embodiment, battery cells may be electrically connected in series, in parallel, or a combination of series and parallel. As used in this disclosure a "series connection" is wiring a first terminal of a first cell to a second terminal of a second cell and further configured to comprise a single conductive path for electricity to flow while maintaining the same current (measured in Amperes) through any component in the circuit. Battery cells may use the term 'wired,' but one of ordinary skill in the art would appreciate that this term is synonymous with 'electrically connected', and that there are many ways to couple electrical elements like battery cells together. For example and without limitation, battery cells can be coupled via prefabricated terminals of a first gender that mate with a second terminal with a second gender. As used in this disclosure a "parallel connection" is wiring a first and second terminal of a first battery cell to a first and second terminal of a second battery cell and further configured to comprise more than one conductive path for electricity to flow while maintaining the same voltage (measured in Volts) across any component in the circuit. Battery cells may be wired in a series-parallel circuit which combines characteristics of the constituent circuit types to this combination circuit. Battery cells may be electrically connected in any arrangement which may confer onto the system the electrical advantages associated with that arrangement such as high-voltage applications, high-current applications, or the like. As used in this disclosure an "electrochemical cell," is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. Non-limiting examples of battery cells may include batterie cells used for starting applications including Li ion batteries cells which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations. A battery cell may include, without limitation a battery cell using nickel based chemistries such as nickel cadmium or nickel metal hydride, a battery cell using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery cell using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as battery cells.

Still referring to FIG. 1, battery module 116 is secured to pack casing 104 by a battery module connection. As used in this disclosure a "battery module connection" is a component and/or mechanism that secures battery module 116 to pack casing 104. Battery module connection may be accomplished, without limitation, by bolting, riveting, welding, press fitting, and the like thereof. For example, and without limitation a solid and/or round head rivet may be used to attach battery module 116 to pack casing 104. As a further non-limiting example, a blind and/or pop rivet may be used to attach battery module 116 to pack casing 104. As a further non-limiting example, an oxy-acetylene weld and/or electric arc weld may be used to attach battery module 116 to pack casing 104. As a further non-limiting example, a shielded metal arc weld and/or gas metal arc weld may be used to attach battery module 116 to pack casing 104. As a further non-limiting example, a composite press-fit insert may be used to attach battery module 116 to pack casing 104. Battery module connection may be accomplished, without limitation, by one or more locking methods. For example, and without limitation battery module connection may include a friction locking method that may secure battery module 116 to packing case 104 as a function of increasing resistance between contact surfaces. In an embodiment and without limitation, friction locking method may include the implementation of one or more split ring washers, serrated washers, tooth lock washers, nylon insert nuts, double nuts, and the like thereof. As a further non-limiting example, battery module connection may include a mechanical locking method that may secure battery module 116 to packing case 104 as a function of a physical barrier that may prevent the fastener from rotating. In an embodiment and without limitation, mechanical locking method may include the implementation of one or more tab washers, locking wires, and the like thereof. As a further non-limiting example, battery module connection may include an adhesive locking method that may secure battery module 116 to packing case 104 as a function of applying a chemical to prevent a bolted joint from loosening. In an embodiment and without limitation, adhesive locking method may include the implementation of one or more adhesives such as methacrylate-based thread-locking fluids with low strength, medium strength, high strength, high temperature, penetrating, and the like thereof.

In an embodiment, and still referring to FIG. 1, battery module connection may include any means for attachment that is configured to disconnect under a predetermined load. In some cases, battery module connections may be passive and rely upon loading forces for disconnection, such as exemplary battery module connections which may include one or more of a shear pin, a frangible nut, a frangible bolt, a breakaway nut, bolt, or stud, and the like. In some cases, a passive battery module connection may include a relatively soft or brittle material (e.g., plastic) which is easily broken under achievable loads. Alternatively or additionally, battery module connection may include a notch, a score line, or another weakening feature purposefully introduced to the mount to introduce breaking at a prescribed load. According to some embodiments, a canted coil spring may be used to as part of a battery module connection, to ensure that the mount disconnects under a predetermined loading condition. In some cases a mount may comprise a canted coil spring, a housing, and a piston; and sizes and profiles of the housing and the piston may be selected in order to prescribe a force required to disconnect the mount. Alternatively or additionally, battery module connection may include an active feature which is configured to actively disconnect a mount under a prescribed condition (for instance a rapid change in elevation or large measured G-forces). For example, and without limitation, an active mount may be configured to actively disconnect during a sensed crash. An active mount may, in some cases, include one or more of an explosive bolt, an explosive nut, an electro-magnetic connection, and the like. In some cases, one or more battery module connections may be configured to disconnect under a certain loading condition, for instance a force in excess of a predetermined threshold (i.e., battery breakaway force) acting substantially along (e.g., within about +/−45°) a predetermined direction.

In an embodiment and still referring to FIG. 1, pack casing 104 may include an external shell to protect battery module 116. As used in this disclosure an "external shell" is a rigid structure that absorbs and/or prevents an initial impact energy from an external source, wherein an external source is one or more objects and/or items that are located outside of pack casing 104. For example, and without limitation, may include a rigid structure such as polycarbonate, acrylonitrile butadiene styrene, polypropylene, high impact polystyrene, perfluoroalkoxy alkane, polytetrafluoroethylene, polyvinylidene fluoride, ceramic, and the like thereof. As a further non-limiting example, external shell may include one or more polymers such as shock absorbing polymers, visco-elastic polymers, visco polymers, polyurethanes, and the like thereof. As a further non-limiting example, external shell may include one or more metals such as stainless steel, duplex alloys, nickel, nickel-based alloys, titanium, titanium alloys, and the like thereof.

Still referring to FIG. 1, battery pack 100 includes a crush zone 120. As used in this disclosure a "crush zone" is a region within pack casing 104 that is designed to compress and/or crush to absorb a force. Crush zone 120 may be configured to prevent a thermal runaway of battery module 116. As used in this disclosure "thermal runaway" is an accelerated increase in temperature of battery module 116 as a function of current flowing through battery module 116 rapidly. For example and without limitation, thermal runaway may result in explosions and/or overheating as a function of battery module 116 being physically damaged and/or harmed as a function of an external force. Crush zone 120 is located beneath battery module 116. Crush zone may include a location and/or region produced as a function of battery module 116 of the plurality of battery modules being secured to the upper wall of pack casing 104. Battery module may be secured to upper wall of pack casing 104 as a function of one or more battery module connections. For example, and without limitation, crush zone 120 may include a predetermined amount of space between battery module 116 and lower wall of pack casing as a function of a plurality of nuts and bolts that may be utilized to secure battery module 116 to the upper wall of pack casing to at least raise battery module 116. In an embodiment and without limitation, crush zone 120 may include a thickness parameter. As used in this disclosure a "thickness parameter" is a predetermined amount of distance and/or space that separates the lower wall of packing case 104 and the bottom of battery module 116. In an embodiment and without limitation, thickness parameter may include a predetermined distance of 15 cm and/or 5.91 inches. As a further non-limiting example, thickness parameter may include a predetermined distance of 2 meters and/or 78.74 inches. In an embodiment, and without limitation, thickness parameter may be determined as a function of an impact energy. As used in this disclosure an "impact energy" is an energy produced as a function of an impact. For example, and without limitation, impact energy may be determined to be 40 N, wherein the thickness parameter is adjusted to allow for an absorption of 40 N of energy.

In an embodiment and still referring to FIG. 1, crush zone 120 may be configured as a to reduce an impact force. As used in this disclosure an "impact force" is a force that is generated as a function of a vertical drop from a given height. Impact force may be generated as a function of the weight and/or size of the battery module falling, the velocity prior to impacting the ground, the height of the vertical drop, and/or the distance traveled after initial impact with the ground. For example, impact force may be 40.83 N for a vertical drop of 6 meters of a 5 kg battery module. In an embodiment and without limitation, crush zone 120 may be configured to reduce impact force as a function of increasing the distance traveled after initial impact. For example and without limitation, an impact force may be 2,940,000 N for a vertical drop of 3000 m of a 10 kg battery module, wherein there is no travel after impact, wherein an impact force may be 98,000 N for the same vertical drop of 3000 m of a 10 kg battery module, wherein there is a 3 m distance after initial impact. As a further non-limiting example, an impact force an aircraft vertical drop may be 2,450,000,000 N for a vertical drop of 2500 m of a 10,000 kg aircraft, wherein this is no travel after impact, wherein an impact force of 49,000,000 N for the same vertical drop of the aircraft of 2500 m of a 10,000 kg aircraft, wherein there is a 5 m distance traveled after impact. In an embodiment, and without limitation, crush zone may be determined as a function of a maximum aircraft vertical drop. As used in this disclosure a "maximum aircraft vertical drop" is the estimated vertical drop of an aircraft at its maximum height in a given flight path. For example, a maximum height for a flight path may be 2561 meters.

Still referring to FIG. 1, crush zone 120 is comprised of an energy absorbing material 124. As used in this disclosure an "energy absorbing material" is a material and/or substance capable of absorbing a force. For example, and without limitation, energy absorbing material 124 may include one or more energy absorbing characteristics such as conductivity, flame resistance, density, absorption, structure, and the like thereof as described in detail below, in reference to FIG. 3. In some cases, energy absorbing material 124 may be configured to absorb and/or dissipate energy as it is compressed. In some cases, energy absorbing material 124 may include a material having a number of voids, for instance compressible material may take a form of a honeycomb or another predictably cellular form. Alternatively or additionally, energy absorbing material 124 may include a non-uniform material, such as without limitation a foam. As a further non-limiting example, energy absorbing material 124 may include a polyether ether ketone material. As a further non-limiting example, energy absorbing material 124 may include a polymer foam. As a further non-limiting example, energy absorbing material 124 may include a non-Newtonian polymer. Energy absorbing material 124 may include a polymer and/or other dampening material such as a foam, gel, fluid, mesh, and the like thereof. For example, and without limitation, energy absorbing material may include a polycarbonate polymer, polypropylene polymer, polystyrene polymer, urethane foam polymer, shock absorbing polymer, visco-elastic polymer, visco polymer, and the like thereof. As a further non-limiting example, energy absorbing material may include one or more materials that reduce one or more shock energies, vibration energies, frequencies, and the like thereof.

Still referring to FIG. 1, energy absorbing material 124 is configured to compress as a function of a crash force. As used in this disclosure a "crash force" is a force exerted on battery pack 100 as a function of one or more crashes and/or impacts. In an embodiment crash force may be exerted on battery pack 100 as a function of an aircraft crash and/or vehicular crash. Energy absorbing material 124 may be configured to compress as a function of absorbing a predetermined amount of force, wherein a predetermined amount of force may include an applied load magnitude acting on energy absorbing material. For example, and without limitation, an applied load magnitude may act to reduce the length and/or thickness of energy absorbing material as a function of squeezing the material between battery module 104 and the lower wall of pack casing 104 due to the load exceeding the compressive strength of energy absorbing material. In another embodiment predetermined amount of force may include a suddenly applied load. For example, and without limitation, suddenly applied load may exceed the impact strength of energy absorbing material 124, wherein energy absorbing material 124 compresses as a function of the suddenly applied load. In yet another embodiment, energy absorbing material 124 may be configured to absorb a predetermined direction of force, wherein a predetermined direction of force may include a directional load and/or force acting on energy absorbing material. For example, and without limitation, a vertical direction of force may result in a compression of energy absorbing material 124 at a specified magnitude of force, wherein a horizontal direction of force may result in a lesser and/or no compression of energy absorbing material 124. As a further non-limiting example, a horizontal direction of force may result in a compression of energy absorbing material 124 at a specified magnitude of force, wherein a vertical direction of force may result in a lesser and/or no compression of energy absorbing material 124.

In an embodiment, and still referring to FIG. 1, crash force 124 may include an excessive force. As used in this disclosure an "excessive force" is a landing force that exceeds a landing force threshold. As used in this disclosure a "landing force threshold" is a maximum force that may be achieved during the landing of an aircraft. For example, and without limitation a landing force threshold may be a force that is calculated relative to a specific amount of force greater than gravity, wherein the force exerted on the aircraft by gravity is determined by $$F = G\frac{m_1 m_2}{r^2}$$

wherein F is the force exerted on the aircraft by gravity, G is the gravitational constant, $m_1$ is the mass of the aircraft, $m_2$ is the mass of the earth, and r is the distance between the centers of the masses.

In an embodiment and still referring to FIG. 1, battery module connection releases battery module 116 into crush zone 120 guided by inner lining 112. In yet another embodiment, inner lining 112 may be configured to guide battery module 116 to the ground. For example, and without limitation, inner lining 112 may be configured to allow battery module 116 to move in a vertical direction and/or along a y-axis. In an embodiment, and still referring to FIG. 1, battery module connection releasing battery module 116 further comprises breaking a frangible buswork. As used in this disclosure a "frangible buswork" is one or more connections and/or buswork attached to battery module 116 that are fragile and/or brittle, wherein a buswork is one or more conductors and/or group of conductors that serve as a common connection for two or more electrical circuits. For example, and without limitation, frangible buswork may include one or more fuse bolts, special material bolts, frangible couplings, tear-through fasteners, tear-out sections, and the like thereof. As a further non-limiting example, frangible buswork may include one or more electrical connections such as plug and socket connectors, crimp-on connectors, soldered connectors, binding posts, screw terminals, ring and spade connectors, blade connectors, and the like thereof.

Still referring to FIG. 1, battery module connection may be configured to release battery module 116 as a function of the crash force exceeding a breakaway force. As used in this disclosure a "breakaway force" is an amount of force required to break and/or release at least a battery module connection that is securing battery module 116 to pack casing 104. For example, and without limitation, breakaway force may include a force of 200 N to break a battery module connection that secures battery module 116 from pack casing 104. As a further non-limiting example, breakaway force may include a force of 5,000 N to release a plurality of battery module connections that secure battery module 116 from pack casing 104. In an embodiment and without limitation, breakaway force may be a function of the one or more attachment mechanisms securing battery module 116 to pack casing. For example, and without limitation, breakaway force for a nut and bolt may be 720 N, wherein breakaway force for an electric arc weld may be 2000 N. In this manner, one or more breakaway forces may be established for battery module 116, prior to breaking and/or releasing battery module connection.

In an embodiment, and still referring to FIG. 1, breakaway force may be configured as a function of a predetermined amount of force. For example, and without limitation, a predetermined amount of force may include a threshold force. As used in this disclosure a "threshold force" is an amount of force required to reach a threshold for releasing and/or breaking the secured attachment of battery module 116 to pack casing 104. For example, and without limitation threshold force may be 6,000 N to break battery module connection, wherein breaking battery module connection breaks the secured attachment of battery module 116 to pack casing 104 allowing battery module to be guided towards energy absorbing material 124 as a function of inner lining 112. As a further non-limiting direction threshold force may include a force of 2,000 N to release battery module connection, wherein releasing battery module connection allows battery module 116 to be guided down inner lining 112 and interact with energy absorbing material without breaking battery module connection. In an embodiment threshold force may include a releasing level. As used in this disclosure a "releasing level" is an amount of force required to release the battery module connection that secures battery module 116 to pack casing in a controlled and/or timed release. For instance, and without limitation, releasing level may release battery module 116 over a 30 second release period to allow for energy absorbing material to absorb a greater amount of impact force.

Still referring to FIG. 1, breakaway force may be configured as a function of a predetermined direction of force. For example, and without limitation, a predetermined direction of force may denote that a force exerted on battery module connection and/or pack casing in the vertical direction may result in breakage of battery module connection at a specified magnitude of force, wherein a horizontal direction of force may result in no breakage of battery module connection. As a further non-limiting example, predetermined direction of force may denote that a force exerted on battery module connection and/or pack casing at an angle of greater than 30° may initiate a release of battery module connection from pack casing, wherein releasing battery module connection from pack casing results in the movement of battery module 116 downwards towards energy absorbing material 124.

Still referring to FIG. 1, battery pack 100 may further comprise a secondary crush zone. As used in this disclosure a "secondary crush zone" is a region within pack casing 104 that is generated as a function of battery module 116 shifting downwards and compressing energy absorbing material 124. In an embodiment, secondary crush zone may be located between the upper wall of pack casing 104 and the top of battery module 116. For example, and without limitation, secondary crush zone may increase in thickness as battery module 116 compresses energy absorbing material 124. In an embodiment, the thickness of secondary crush zone may be similar to the thickness of crush zone 120. For example, battery module 116 may compress energy absorbing material 124 as a function of shifting downward guided by inner lining 112, wherein secondary crush zone increases in thickness relative to the amount of compression that occurs in energy absorbing material 124. As a further non-limiting example, secondary zone compression may be 4 due to battery module 116 compressing energy absorbing material 124 4 cm. In another embodiment, secondary crush zone may protect battery module 116 from one or more debris and/or aircraft parts. For example, and without limitation, secondary crush zone may provide a predetermined distance between the upper wall of pack casing 104 and providing protection impact from external stimulus in the vertical direction, wherein the predetermined distance is determined as a function of the thickness of crush zone 120. In another embodiment, secondary crush zone may protect battery module 116 from one or more airframe impacts. As used in this disclosure an "airframe impact" is an impact on pack casing 104 as a function of one or more aircraft frame parts. For example, and without limitation an aircraft frame part of the fuselage may land on top of and/or vertically impact the pack casing, wherein secondary crush zone may provide protection for battery module 116.

Figure 2A:
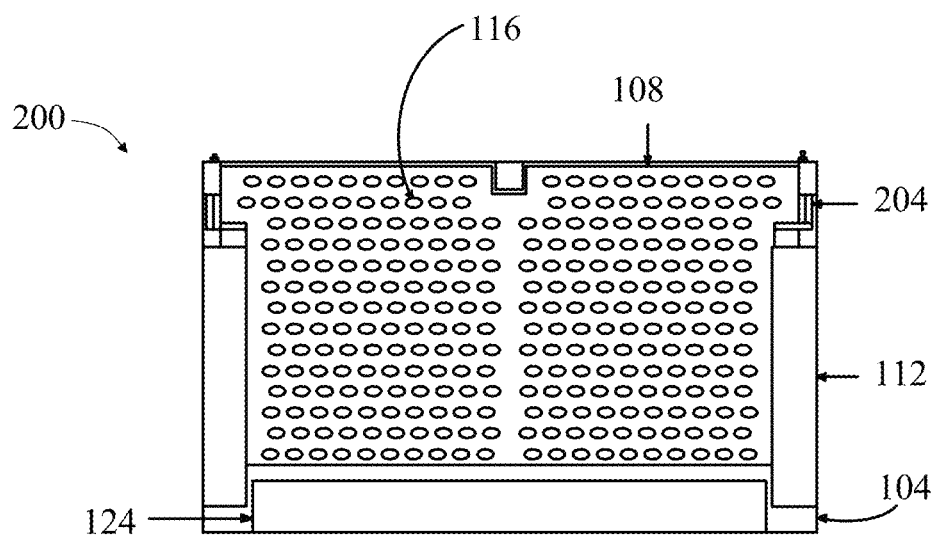
FIG. 2 are diagrammatic representations illustrating various states of an exemplary embodiment of a battery pack for failure safety.
Figure 2B:
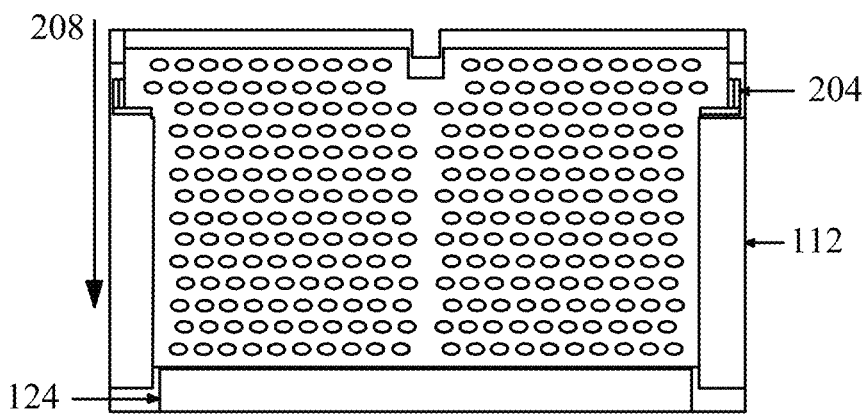
Figure 2C:
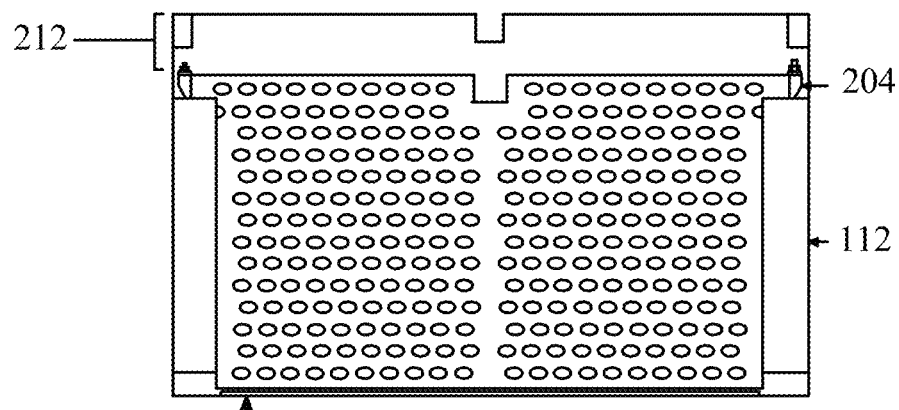

Referring now to FIGS. 2A-C, an embodiment 200 of a battery pack for failure safety is displayed. In FIG. 2A, battery module 116 is secured to upper wall of pack casing 104 as a function of a battery module connector 204, wherein battery module connector 204 includes any of the battery module connector as described above in reference to FIG. 1. Battery module 116 is located within inner lining 112. Energy absorbing material 124 is located beneath battery module 116 in an uncompressed state. In FIG. 2B, a crash force 208 is exerted on pack casing 104, wherein crash force 208 includes any of the crash force as described above, in reference to FIG. 1. Crash force 208 may be of a large enough magnitude to break and/or release battery module connector 204, wherein releasing battery module connector 204 results in battery module 104 being guided by inner lining 112 towards energy absorbing material 124. Energy absorbing material may begin to compress as a function of the applied load of battery module 104 on energy absorbing material 124. In FIG. 2C, battery module 116 completes the compression of energy absorbing material 124. For example, and without limitation, complete compression of energy absorbing material 124 may include compression of 50% of the crush zone, 25% of the crush zone, and/or 100% of the crush zone as a function of the one or more energy absorbing characteristics, wherein energy absorbing characteristics are described in detail below, in reference to FIG. 3. In an embodiment, secondary crush zone 212 may be generated as a function of the complete compression of energy absorbing material 124, wherein secondary crush zone 212 may include any of the secondary crush zone 212 as described above, in reference to FIG. 1.

Figure 3:
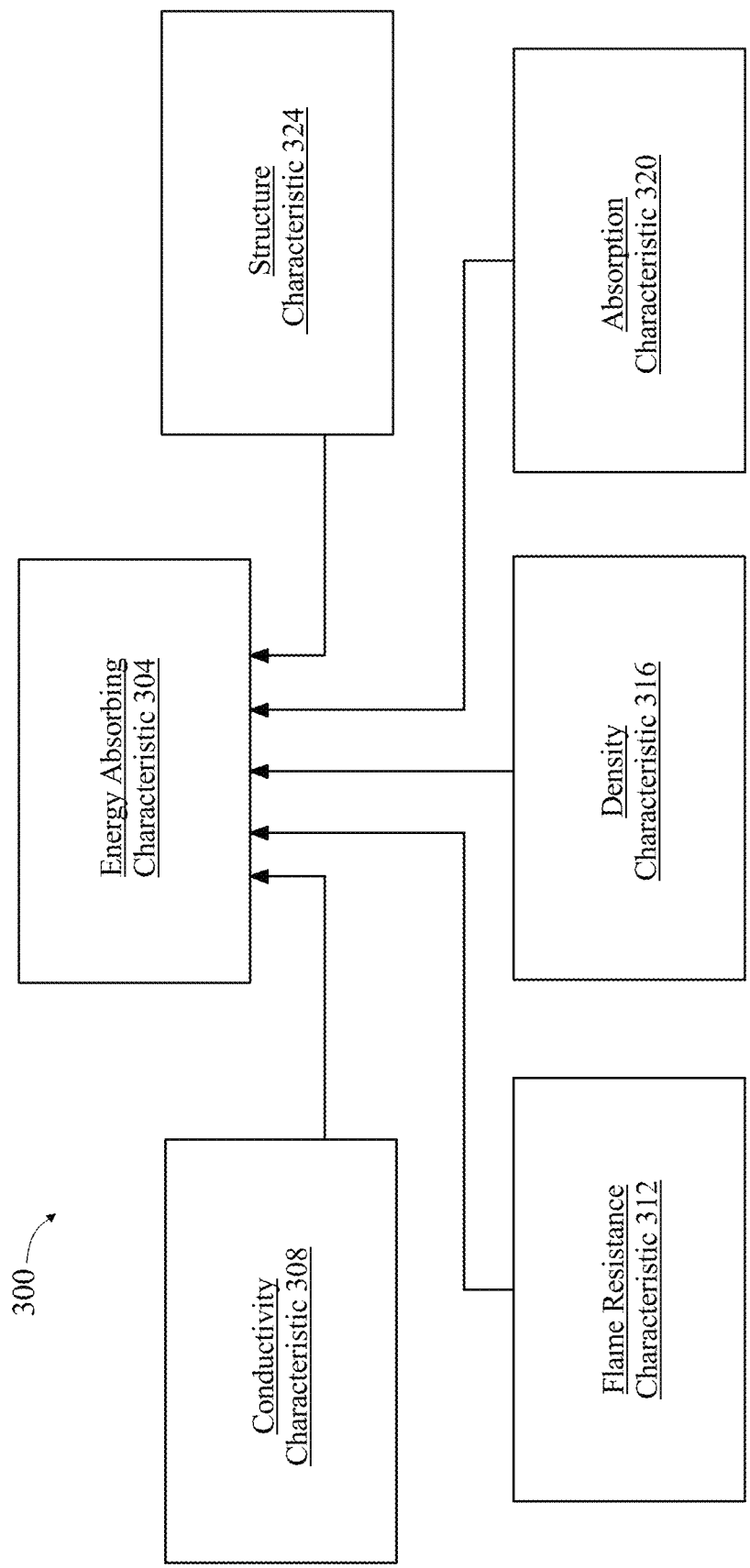
FIG. 3 is a block diagram of an energy absorbing material according to an embodiment of the invention.

Now referring top FIG. 3, an exemplary embodiment 300 of an energy absorbing characteristic 304 is illustrated. As used in this disclosure an "energy absorbing characteristic" is one or more qualities associated with energy absorption and/or failure safety. In an embodiment and without limitation, energy absorbing characteristic 304 may include a conductivity characteristic 308. As used in this disclosure a "conductivity characteristic" is an ability to transmit and/or resist electric current. For example, and without limitation conductivity characteristic 308 may include one or more measurable values associated with conductivity such as resistivity, conductivity, temperature, and/or composition such as, but not limited to superconductors, metals, semiconductors, insulators, super insulators, and the like thereof. In an embodiment, and without limitation, conductivity characteristic 30 may denote one or more qualities that aid in reducing thermal runaway to promote failure safety. In an embodiment, and without limitation, energy absorbing characteristic 304 may include a flame resistance characteristic 312. As used in this disclosure a "flame resistance characteristic" is an ability to withstand oxidation, burning, and/or a fire and maintain functionality. For example, and without limitation, flame resistance characteristic 312 may include one or more fire-resistance rating such as a class 125 rating, class 150 rating, class 350 rating, and the like thereof. As a further non-limiting example, flame resistance characteristic 312 may denote one or more time/temperature curves to denote a materials functionality over time as a function of the temperature variances during a fire.

In an embodiment, and still referring to FIG. 3, energy absorbing characteristic 304 may include a density characteristic 316. As used in this disclosure a "density characteristic" is a measurable value associated with a mass per unit volume. For example, and without limitation density characteristic may denote that a foam has a 22 pounds per cubic foot denoting a high density. As a further non-limiting example, density characteristic may include one or more buckling and/or crushing stress values, plateau stress values, and/or densification stress values. In an embodiment, and without limitation, energy absorbing characteristic 304 may include an absorption characteristic 320. As used in this disclosure an "absorption characteristic" is an ability to absorb and/or mitigate an impact and/or shock. For example, and without limitation, absorption characteristic 320 may include one or more characteristics associated with reducing one or more shock energies, vibration energies, frequencies, and the like thereof. In an embodiment, and without limitation, energy absorbing characteristic 304 may include a structure characteristic 324. As used in this disclosure a "structure characteristic" is a structural formation of the material. For example, and without limitation, structural characteristic 324 may include one or more structures of a material such as, but not limited to hexagonal structure, triangular structure, rectangular structure, and the like thereof. In an embodiment and without limitation, structure characteristic 324 may denote a honeycomb structure of a material and/or a sandwich structured compositive structure consisting of a plurality of layers with a plurality of structures.

Figure 4:
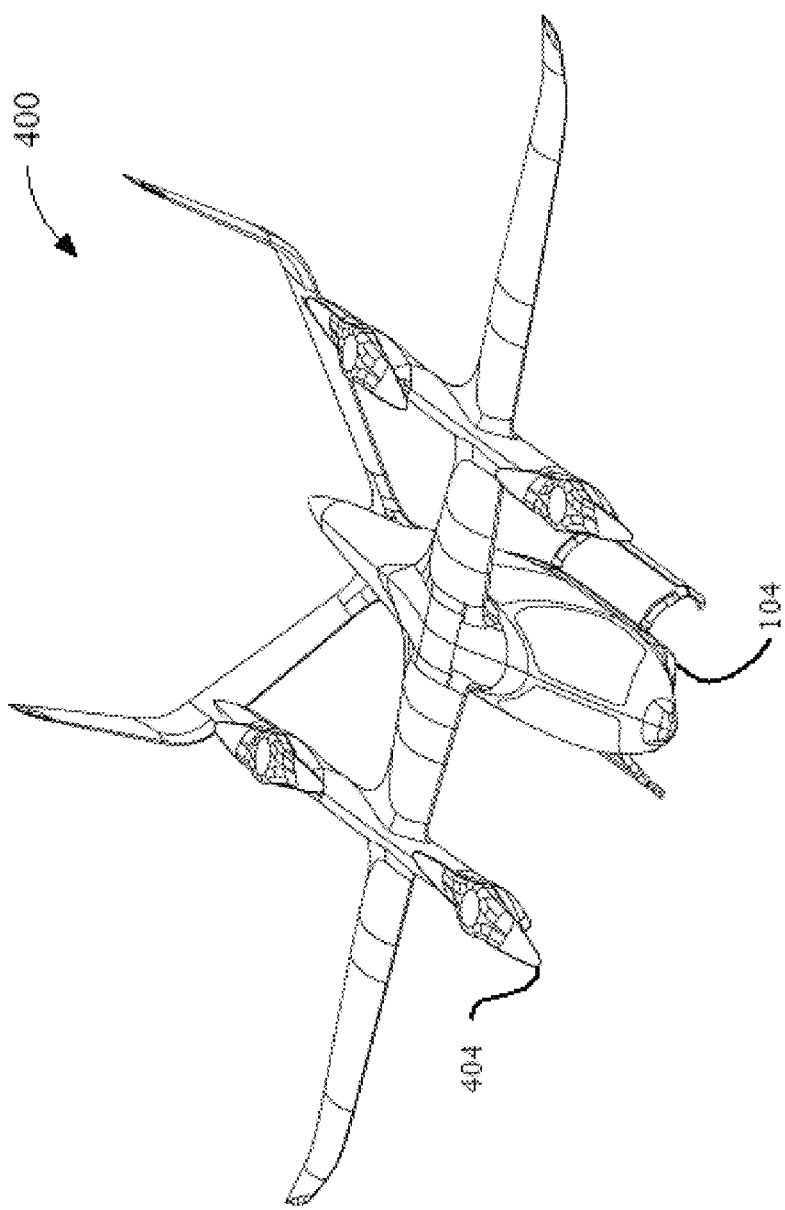
FIG. 4 is a diagrammatic representation of an exemplary embodiment of an aircraft.

Referring now to FIG. 4, an exemplary embodiment of an aircraft 400 is illustrated. In embodiments, electrically powered aircraft 400 may be an electric vertical takeoff and landing (eVTOL) aircraft. Electrically powered aircraft 400 may include pack casing 104 located underneath the fuselage of the aircraft. Electrically power aircraft may include one or more flight control elements 404A-N. As used in this disclosure a flight control element" is a component that can be moved and/or adjusted to affect altitude, airspeed velocity, groundspeed velocity, and/or direction during flight. For example, flight control element 404A-N may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, a flight control element 404A-N may include a rudder, which may include, without limitation, a segmented rudder. The rudder may function, without limitation, to control yaw of an aircraft. Also, a flight control element 404A-N may include other flight control surfaces such as propulsors, rotating flight controls, or any other structural features which can adjust the movement of the aircraft.

Still referring to FIG. 4, a flight control element 404 may include at least a propulsor. A propulsor, as used herein, is a component or device used to propel a craft by exerting force on a fluid medium, which may include a gaseous medium such as air or a liquid medium such as water. In an embodiment, when a propulsor twists and pulls air behind it, it will, at the same time, push an aircraft forward with an equal amount of force. The more air pulled behind an aircraft, the greater the force with which the aircraft is pushed forward. Propulsor may include any device or component that consumes electrical power on demand to propel an electric aircraft in a direction or other vehicle while on ground or in-flight.

Still referring to FIG. 4, electric aircraft 400 may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Continuing to refer to FIG. 4, an illustration of forces is illustrated in an electric aircraft. During flight, a number of forces may act upon the electric aircraft. Forces acting on an aircraft 400 during flight may include thrust, the forward force produced by the rotating element of the aircraft 400 and acts parallel to the longitudinal axis. Drag may be defined as a rearward retarding force which is caused by disruption of airflow by any protruding surface of the aircraft 400 such as, without limitation, the wing, rotor, and fuselage. Drag may oppose thrust and acts rearward parallel to the relative wind. Another force acting on aircraft 400 may include weight, which may include a combined load of the aircraft 400 itself, crew, baggage and fuel. Weight may pull aircraft 400 downward due to the force of gravity. An additional force acting on aircraft 400 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An electric aircraft with a battery pack for failure safety, the electric aircraft comprising:
   a fuselage having a longitudinal axis; and
   a battery pack disposed within the fuselage, wherein the battery pack comprises:
     a pack casing mounted to the fuselage, wherein the pack casing comprises an inner lining;
     a crush zone positioned parallel to the longitudinal axis beneath a battery module, wherein the crush zone comprises an energy absorbing material configured to compress as a function of a crash force;
     a battery module connection that attaches the battery module to the pack casing, and wherein the battery module connection is configured to disconnect in response to the crash force; and
     a secondary crush zone that is located between a top of the battery module and an upper wall, wherein the secondary crush zone increases in thickness as the battery module is guided downward towards the crush zone;
     wherein the inner lining is configured to guide the battery module towards the crush zone when the battery module connection is disconnected.

2. The electric aircraft of claim 1, wherein the pack casing includes an external shell.

3. The electric aircraft of claim 1, wherein the pack casing comprises at least a side wall configured with a high compression strength element.

4. The electric aircraft of claim 3, wherein the high compression strength element comprises a honeycomb arrangement.

5. The electric aircraft of claim 3, wherein the at least a side wall is configured to secure the inner lining of the pack casing.

6. The electric aircraft of claim 1, wherein the pack casing comprises a lower wall.

7. The electric aircraft of claim 6, wherein:
   the crush zone is located adjacent to the lower wall of the pack casing; and
   the crush zone comprises a thickness parameter.

8. The electric aircraft of claim 1, wherein the energy absorbing material is composed of a compressible material.

9. The electric aircraft of claim 1, wherein the energy absorbing material includes polyether ether ketone.

10. The electric aircraft of claim 1, wherein the energy absorbing material includes polymer foam.

11. The electric aircraft of claim 1, wherein the energy absorbing material is configured to absorb a predetermined amount of force.

12. The electric aircraft of claim 1, wherein the energy absorbing material is configured to absorb a predetermined direction of force.

13. The electric aircraft of claim 1, wherein:
the energy absorbing material includes an energy absorbing characteristic; and
the energy absorbing characteristic comprises a conductivity characteristic.

14. The electric aircraft of claim 1, wherein:
the energy absorbing material includes an energy absorbing characteristic; and
the energy absorbing characteristic comprises a flame resistance characteristic.

15. The electric aircraft of claim 1, wherein the crush zone is configured to reduce an impact force.

16. The electric aircraft of claim 1, wherein the crush zone is configured to prevent a thermal runaway of the battery module.

17. The electric aircraft of claim 1, further comprising at least a flight control element configured to affect flight of the electric aircraft.

* * * * *